Dec. 13, 1966     P. F. HAUSTOVICH     3,291,288

CONVEYOR BELT

Filed Aug. 31, 1964

INVENTOR.
PAUL F. HAUSTOVICH

BY *W. B. Hampman*

ATTORNEY

United States Patent Office 3,291,288
Patented Dec. 13, 1966

3,291,288
CONVEYOR BELT
Paul F. Haustovich, Youngstown, Ohio, assignor to Aeroquip Corporation, Jackson, Mich., a corporation of Michigan
Filed Aug. 31, 1964, Ser. No. 393,190
6 Claims. (Cl. 198—193)

This invention relates to conveyor belts for handling various materials.

The principal object of the invention is the provision of a conveyor belt having improved characteristics and comprising a less expensive construction than found in prior conveyor belt constructions.

A further object of the invention is the provision of a conveyor belt having improved adhesion between the various materials thereof as compared with prior conveyor belt constructions.

A further object of the invention is the provision of a conveyor belt having improved flexing characteristics as compared with prior conveyor belt constructions.

A still further object of the invention is the provision of a conveyor belt having excellent fastener retention contributing to an improved and trouble-free joint between the ends of adjacent sections.

A still further object of the invention is the provision of a conveyor belt having a remarkable low-stretch factor.

A still further object of the invention is the provision of a conveyor belt having excellent troughing characteristics.

In the handling of various materials, various types of conveyor belts are employed. For example, a rough top belt is employed for handling cartons and individual items which are moved upwardly or downwardly at an angle to horizontal, and such belts, as well as smooth cover industrial conveyer belts, are passed over and guided by rollers to provide a moving conveying surface for the material to be conveyed. At times, troughing rollers are employed to provide a moving trough in which material is deposited and conveyed. All such belts are commonly passed over relatively small diameter pulleys with the result that their life is limited by their ability to resist ply separation resulting from the tension and flexing encountered in such service.

The conveyor belt disclosed herein comprises an improvement in the art in that the heretofore believed necessary carcass comprising a plurality of plies of woven fabric are substantially eliminated and a carcass material comprising cracked tire cord material (formed of remnants left from a tire building operation) is substituted therefor. Cracked tire cord material is an uncured rubber or rubber-like material having a plurality of short pieces of cord therein as derived from the carcass remnants of rayon or nylon filament cord, impregnated or skimmed with soft high-grade rubber or rubber-like components and which remnants are passed through "crackers" so as to chop the cords into shorter lengths with random orientation, thus resulting in a millable and curable fibrous rubber-like product.

In the conveyor belt disclosed herein, the carcass comprising a number of woven fabric plies heretofore found in a conveyor belt between the covers thereof is eliminated in its entirety and a carcass of the cracked tire cord material is utilized instead. The improved conveyor belt, therefore, comprises an integral cured body formed of a cacass of cracked tire cord material, a cover thereover, and a relatively thin bottom layer formed of one or more woven fabric plies. The resulting conveyor belt has the improved characteristics noted in the foregoing objects, and the costs of the material and labor are considerably lower than the comparable costs of prior conveyor belts.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
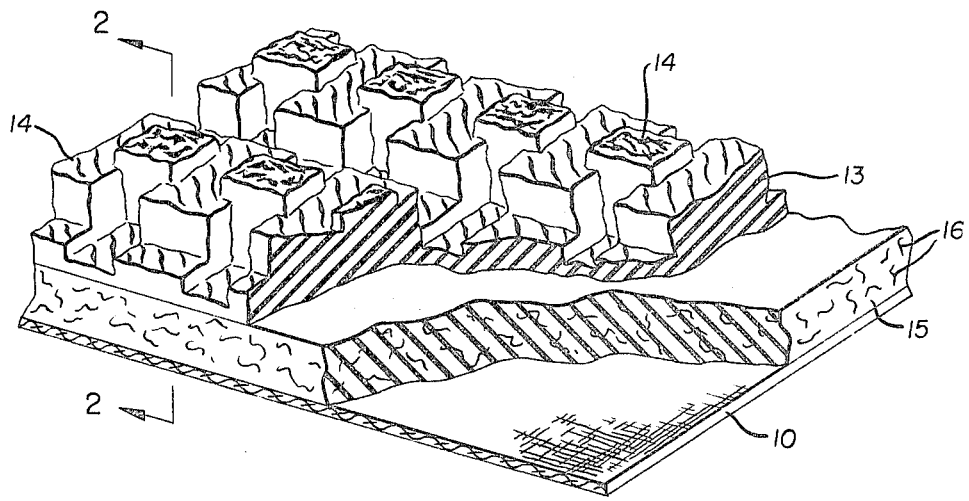
FIGURE 1 is a perspective view, on a greatly enlarged scale, of a portion of a rough top conveyor belt with parts broken away and parts in cross section.

By referring to the drawings and FIGURE 1 in particular, it will be seen that a small portion of a rough top conveyor belt is illustrated and that an end portion thereof has been cut away to expose the layers of the materials used in the construction thereof. In FIGURE 1, the bottom layer of the improved conveyor belt comprises a bottom ply 10 which consists of a fabric preferably woven of cotton and nylon cords, although various other fibers may be used if desired. The bottom ply 10 includes warp and filler cords 11 and 12 as best seen in the greatly enlarged cross section comprising FIGURE 2 of the drawings. Those skilled in the art will be aware of the fact that the bottom fabric ply 10 thus formed has a rubberized coat and/or skimmed coat of rubber or rubber-like material applied thereto. The uppermost layer of the improved conveyor belt chosen for illustration comprises a rubber or rubber-like cover 13 which has a molded rough top configuration as known in the at, but may comprise a smooth cover when desired.

As illustrated in FIGURE 1, the rough cover layer 13 includes a plurality of irregularly shaped vertical projections 14, 14. The cover 13 and bottom ply 10 are spaced by an intermediate layer of cracked tire cord material generally indicated by the numeral 15 and which comprises carcass remnants of rayon, nylon and/or other synthetic filament cords 16 impregnated or skimmed with soft high-grade rubber or rubber-like compounds resulting from pneumatic tire building operations. The cracked tire cord material is treated so as to chop the filament cords 16 into shorter lengths and which operation results in their random orientation.

Figure 2:
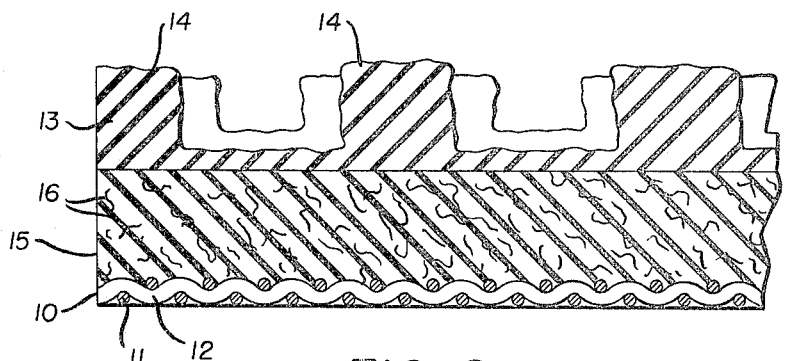
FIGURE 2 is a vertical section on line 2—2 of FIGURE 1.

By referring to FIGURE 2 of the drawings, it will be seen that this enlarged cross sectional detail illustrates the woven fabric of the bottom ply 10 with the cracked tire cord material 15 positioned thereon and in turn supporting the cover 13 with its rough top configuration. It will be seen that the random oriented pieces of cracked tire cord 16 are evenly dispersed throughout the rubber-like material which comprises the remainder of the cracked tire cord remnant material 15 as will be understood by those skilled in the art, and it will be further observed that the cracked tire cord pieces 16 are positioned in every conceivable position relative to one another and uniformly throughout the material 15.

The conveyor belt thus formed is then cured as will be understood by those skilled in the art so that a uniform integral bond occurs between the rubberized woven fabric bottom ply 10, the cracked tire cord material 15 and the cover material 13. The improved conveyor belt thus is formed only of the bottom fabric layer, the cracked tire cord material 15 and the cover material 13. It will be recognized that this construction forms a conveyor belt body that is considerably more flexible and resilient than the conveyor belt bodies heretofore known in the art and which were wholly formed of a plurality of superimposed plies of woven fabric. The cracked tire cord material 15 will thus be seen to be present in the conveyor belt in place of the heretofore believed necessary plurality of fabric plies. It will also be seen that the cover layer 13 may enclose the edges of the cracked tire cord material 15 and the bottom ply 10, as, for example, when a smooth cover industrial belt is formed.

In a preferred embodiment of the invention, the thickness of the cracked tire cord material comprises at least an amount equal in volume and size to the fabric plies that it replaces. It will be obvious that the thickness of the cracked tire cord material can be varied to produce a conveyor belt of extreme flexibility and light weight, or, alternately, with more body, heavier weight and relatively less flexibility as desired. In a typical example of conveyor belt formed in accordance with the invention, the thickness of the cracked tire cord material comprises $3/32''$ which corresponds to the approximately cured thickness of two plies of 28 oz. cotton frictioned fabric heretofore used.

Tests of a standard three-ply conveyor belt of comparable dimension indicate that the adhesion between the cover layer to the top ply averaged 10 p.s.i., while similar tests of the adhesion between the cover and the cracked tire cord material 15 of the improved conveyor belt averaged 17½ p.s.i., thus indicating a considerable improvement in a very desirable characteristic in a conveyor belt.

In the conventional belt, the adhesion between the first ply and second ply averaged 19 p.s.i. and the adhesion between the second ply and third ply averaged 15 p.s.i. In the improved conveyor belt disclosed herein, the adhesion between the bottom of the cracked tire cord material 15 and the bottom layer averaged 17 p.s.i.

The improvement in adhesion and flexing characteristics of the improved conveyor belt disclosed herein were demonstrated by flexing tests utilizing a Scott flexer machine operating at 10,800 cycles per hour moving the test belts over 1¼" diameter pulleys. The conventional three-ply conveyor belt tested failed between the top ply and the second ply at 35,000 cycles. The test sample of the improved conveyor belt disclosed herein functioned perfectly through 86,300 cycles when the test was discontinued with no failure. The adhesion and flexing characteristics are therefore considerably improved as compared with conventional multi-ply conveyor belts.

Tests relating to elongation of belting cured without stretch with 1" wide samples and a 30 lb. load indicated that the conventional three-ply conveyor belt had an elongation average of 2.5%, whereas the improved conveyor belt with the cracked tire cord material replacing the plies as disclosed herein had an elongation of only 1.8%.

Simulated fastener tests wherein nails positioned through samples of belt ½" in from the end of the belt and subjected to pressure to the pull-out point demonstrated that the conventional three-ply conveyor belt withstood the nail pull out to 160 lbs., whereas the improved conveyor belt incorporating the cracked tire cord material as disclosed herein resisted pull out to 200 lbs.

Those skilled in the art will, therefore, observe that tests made on a comparative basis between a conventional three-ply conveyor belt and the improved conveyor belt incorporating the cracked tire cord material as the principal body or carcass thereof clearly indicates superior characteristics and improved adhesion between components, improved flexing, improved fastener retention, relatively lower stretch and excellent flexibility and troughing characteristics. The construction of the new belt is simpler, the materials from which it is made are less expensive as compared with materials heretofore used, and the random orientation of the chopped cord pieces in the chopped tire cord rubber-like material 15 result in a homogeneous, tough, resilient conveyor belt construction meeting the several objects of the invention.

Having thus described my invention, what I claim is:

1. A conveyor belt for receiving and conveying material on the face thereof, said conveyor belt consisting of a body of cracked tire cord material consisting of a soft high-grade rubber-like material having dispersed therein a plurality of randomly oriented short lengths of filament cord, a bottom layer of woven fabric and a cover of rubber-like material, said conveyor belt being cured in situ to form an integral unit having an adhesion between said body and said cover of at least 15 p.s.i.

2. The conveyor belt of claim 1, having a flex life of at least 80,000 cycles.

3. The conveyor belt set forth in claim 1 and wherein said filament cords are formed of synthetic resin fibers.

4. The conveyor belt set forth in claim 1 and wherein said bottom layer of woven fabric is formed of cords of cotton and synthetic resin fibers.

5. The conveyor belt set forth in claim 1 and wherein said bottom layer is rubberized.

6. The new article of manufacture set forth in claim 1 and wherein said cover layer has a rough top configuration integral therewith.

References Cited by the Examiner

UNITED STATES PATENTS 2,984,594  5/1961  Runton _____ 198—193 X

FOREIGN PATENTS 809,969  3/1959  Great Britain.
815,910  7/1959  Great Britain.

EVON C. BLUNK, *Primary Examiner.*

R. E. KRISHER, A. C. HODGSON,
*Assistant Examiners.*